United States Patent
Khosla et al.

(10) Patent No.: US 11,023,685 B2
(45) Date of Patent: Jun. 1, 2021

(54) AFFECT-ENRICHED VECTOR REPRESENTATION OF WORDS FOR USE IN MACHINE-LEARNING MODELS

(71) Applicant: Adobe Inc., San Jose, CA (US)

(72) Inventors: Sopan Khosla, Karnataka (IN); Kushal Chawla, Karnataka (IN); Niyati Himanshu Chhaya, Telangana (IN)

(73) Assignee: Adobe Inc., San Jose, CA (US)

( * ) Notice: Subject to any disclaimer, the term of this patent is extended or adjusted under 35 U.S.C. 154(b) by 42 days.

(21) Appl. No.: 16/412,868

(22) Filed: May 15, 2019

(65) Prior Publication Data
US 2020/0364301 A1   Nov. 19, 2020

(51) Int. Cl.
*G06F 40/30* (2020.01)
*G06N 3/08* (2006.01)

(52) U.S. Cl.
CPC .............. *G06F 40/30* (2020.01); *G06N 3/08* (2013.01)

(58) Field of Classification Search
None
See application file for complete search history.

(56) References Cited

U.S. PATENT DOCUMENTS

| | | | |
|---|---|---|---|
| 2018/0131645 A1* | 5/2018 | Magliozzi | G06F 40/30 |
| 2018/0174020 A1* | 6/2018 | Wu | G06N 3/08 |
| 2019/0109878 A1* | 4/2019 | Boyadjiev | H04L 63/102 |
| 2019/0138599 A1* | 5/2019 | Sen | G06F 40/253 |

OTHER PUBLICATIONS

Yu et al., Improving Lexical Embeddings with Semantic Knowledge, Proceedings of the 52nd Annual Meeting of the Association for Computational Linguistic, Jun. 2014, pp. 545-550.

Xu et al., RC-NET: A General Framework for Incorporating Knowledge into Word Representations, Proceedings of the 23rd ACM International Conference on Conference on Information and Knowledge Management, Nov. 2014, pp. 1219-1228.

Kiela et al., Specializing Word Embeddings for Similarity or Relatedness, Proceedings of the Conference on Empirical Methods in Natural Language Processing, Sep. 2015, pp. 2044-2048.

Faruqui et al., Retrofitting Word Vectors to Semantic Lexicons, Proceedings of NAACL: Human Language Technologies, May-Jun. 2015, pp. 1606-1615.

Miller, WordNet: A Lexical Database for English, Communications of the ACM, vol. 38, No. 11, Nov. 1995, pp. 39-41.

(Continued)

*Primary Examiner* — Stella L. Woo
(74) *Attorney, Agent, or Firm* — Kilpatrick Townsend & Stockton LLP

(57) ABSTRACT

Certain embodiments involve facilitating natural language processing through enriched distributional word representations. For instance, a computing system receives an initial word distribution having initial word vectors that represent, within a multidimensional vector space, words in a vocabulary. The computing system also receives a human-reaction lexicon indicating human-reaction values respectively associated with words in the vocabulary. The computing system creates an enriched word distribution by modifying one or more of the initial word vectors such that the distance between the pair of initial word vectors representing a pair of words is decreased based on a human-reaction similarity between the pair of words.

20 Claims, 7 Drawing Sheets

(56) References Cited

OTHER PUBLICATIONS

Mrkšić et al., Counter-fitting Word Vectors to Linguistic Constraints, Proceedings of the 15th Annual Conference of the NAACL: Human Language Technologies, Jun. 2016, pp. 142-148.
Yu et al., Refining Word Embeddings for Sentiment Analysis, Proceedings of the Conference on Empirical Methods in Natural Language Processing, Sep. 2017, pp. 534-539.
Tool for Computing Continuous Distributed Representations of Words, Word2vec, Available Online at: https://code.google.com/archive/p/word2vec, Jul. 30, 2013, 8 pages.
Mikolov et al., Distributed Representations of Words and Phrases and their Compositionality, Advances in Neural Information Processing Systems, vol. 2, Dec. 5-10, 2013, pp. 1-9.
Mikolov et al., Efficient Estimation of Word Representations in Vector Space, Proceedings of the International Conference on Learning Representations, Jan. 16, 2013, 9 pages.
Cohen et al., Domain Adaptation of a Dependency Parser with a Class-Class Selectional Preference Model, Proceedings of ACL Student Research Workshop, Jul. 2012, pp. 43-48.
Mohammad et al., WASSA-2017 Shared Task on Emotion Intensity, Proceedings of the 8th Workshop on Computational Approaches to Subjectivity, Sentiment and Social Media Analysis, Sep. 2017, pp. 34-49.
Ahn et al., A Neural Knowledge Language Model, CoRR, abs/1608.00318, ArXiv:1608.00318v2, Mar. 2, 2017, 10 pages.
Allen et al., Likert Scales and Data Analyses, Quality Progress, vol. 40, No. 7, Jul. 2007, 7 pages.
Batchkarov et al., A Critique of Word Similarity as a Method for Evaluating Distributional Semantic Models, Proceedings of the 1st Workshop on Evaluating Vector-Space Representations for NLP, Available Online at: https://www.aclweb.org/anthology/W16-2502.pdf, Aug. 2016, pp. 7-12.
Bian et al., Knowledge-Powered Deep Learning for Word Embedding, Proceedings of the European Conference on Machine Learning and Knowledge Discovery in Databases, vol. 1, Sep. 15-19, 2014, pp. 132-148.
Blitzer et al., Biographies, Bollywood, Boom-boxes and Blenders: Domain Adaptation for Sentiment Classification, Proceedings of the 45th Annual Meeting of the Association for Computational Linguistics, vol. 7, Jun. 23-30, 2007, pp. 440-447.
Bojanowski et al., Enriching Word Vectors with Subword Information, Transactions of the Association of Computational Linguistics, vol. 5, No. 1, Jun. 19, 2017, pp. 135-146.
Bollegala et al., Joint Word Representation Learning Using a Corpus and a Semantic Lexicon, Proceedings of the Thirtieth AAAI Conference on Artificial Intelligence, Nov. 19, 2015, pp. 2690-2696.
Bradley et al., Instruction Manual and Affective Ratings, Technical Report C-1, The Center for Research in Psychophysiology, University of Florida, 1999, 49 pages.
Bruni et al., Distributional Semantics in Technicolor, Proceedings of the 50th Annual Meeting of the Association for Computational Linguistics, Long Papers, vol. 1, Jul. 8-14, 2012, pp. 136-145.
Chiu et al., Intrinsic Evaluation of Word Vectors Fails to Predict Extrinsic Performance, Proceedings of the 1st Workshop on Evaluating Vector Space Representations for NLP, Association for Computational Linguistics, Aug. 12, 2016, pp. 1-6.
Cohen, Enron Email Dataset, Aug. 21, 2009, 4 pages.
Danescu-Niculescu-Mizil et al., A Computational Approach to Politeness With Application to Social Factors, 51st Annual Meeting of the Association for Computational Linguistics, Available Online at: https://www.aclweb.org/anthology/P13-1025.pdf, Jun. 25, 2013, pp. 250-259.
Digman, Personality Structure: Emergence of the Five-factor Model, Annual Review of Psychology, vol. 41, No. 1, Jan. 1990, pp. 417-440.
Ekman, An Argument for Basic Emotions, Cognition and Emotion, vol. 6, Nos. 3-4, 1992, pp. 169-200.
Finkelstein et al., Placing Search in Context: The Concept Revisited, Proceedings of the 10th International Conference on World Wide Web, May 1-5, 2001, pp. 406-414.
Gerz et al., Simverb-3500: A Large-scale Evaluation Set of Verb Similarity, Proceedings of the 2016 Conference on Empirical Methods in Natural Language Processing, Association for Computational Linguistics, Nov. 2016, pp. 2173-2182.
Ghosh et al., Affect-LM: A Neural Language Model for Customizable Affective Text Generation, Proceedings of the 55th Annual Meeting of the Association for Computational Linguistics, vol. 1, Long Papers, Apr. 22, 2017, pp. 634-642.
Gladkova et al., Intrinsic Evaluations of Word Embeddings: What Can We Do Better?, Proceedings of the 1st Workshop on Evaluating Vector Space Representations for NLP, Association for Computational Linguistics, Aug. 12, 2016, pp. 36-42.
Hill et al., Simlex-999: Evaluating Semantic Models With (Genuine) Similarity Estimation, Computational Linguistics, vol. 41, No. 4, Association for Computational Linguistics, Aug. 31, 2015, pp. 665-695.
Huang et al., Improving Word Representations Via Global Context and Multiple Word Prototypes, Proceedings of the 50th Annual Meeting of the Association for Computational Linguistics, vol. 1, Long Papers, Association for Computational Linguistics, Jul. 8-14, 2012, pp. 873-882.
Iyyer et al., Deep Unordered Composition Rivals Syntactic Methods for Text Classification, Proceedings of the 53rd Annual Meeting of the Association for Computational Linguistics and the 7th International Joint Conference on Natural Language Processing, vol. 1, Long Papers, Available online at: https://www.aclweb.org/anthology/P15-1162.pdf, Jul. 26-31, 2015, pp. 1681-1691.
Kao et al., A Computational Analysis of Style, Affect, and Imagery in Contemporary Poetry, Proceedings of the NAACL-HLT Workshop on Computational Linguistics for Literature, Jun. 8, 2012, pp. 8-17.
Koper et al., Automatically Generated Affective Norms of Abstractness, Arousal, Imageability and Valence for 350 000 German Lemmas, Proceedings of the Tenth International Conference on Language Resources and Evaluation, European Language Resources Association, May 2016, pp. 2595-2598.
Koper et al., IMS at Emolnt-2017: Emotion Intensity Prediction with Affective Norms, Automatically Extended Resources and Deep Learning, Proceedings of the 8th Workshop on Computational Approaches to Subjectivity, Sentiment and Social Media Analysis, Association for Computational Linguistics, Available Online at: https://www.aclweb.org/anthology/W17-5206.pdf, Sep. 7-11, 2017, pp. 50-57.
Luong et al., Better Word Representations with Recursive Neural Networks for Morphology, Proceedings of the Seventeenth Conference on Computational Natural Language Learning, Association for Computational Linguistics, Available Online at: https://www.aclweb.org/anthology/W13-3512.pdf, Aug. 8-9, 2013, pp. 104-113.
Majumder et al., Deep Learning-based Document Modeling for Personality Detection from Text, IEEE Intelligent Systems, vol. 32, No. 2, Mar. 2017, pp. 74-79.
Manning et al., The Stanford CoreNLP Natural Language Processing Toolkit, Proceedings of 52nd Annual Meeting of the Association for Computational Linguistics: System Demonstrations, Association for Computational Linguistics, Available online at: https://www.aclweb.org/anthology/P14-5010.pdf, Jun. 2014, pp. 55-60.
Miller et al., Contextual Correlates of Semantic Similarity, Language and Cognitive Processes, vol. 6, No. 1, 1991, pp. 1-4.
Mohammad et al., NRC-Canada: Building the State-of-the-art in Sentiment Analysis of Tweets, Second Joint Conference on Lexical and Computational Semantics, Proceedings of the Seventh International Workshop on Semantic Evaluation, vol. 2, Aug. 28, 2013, pp. 321-327.
Palogiannidi et al., Valence, Arousal and Dominance Estimation for English, German, Greek, Portuguese and Spanish Lexica Using Semantic Models, 16th Annual Conference of the International Speech Communication Association, Sep. 6-10, 2015, pp. 1527-1531.
Pavlick et al., An Empirical Analysis of Formality in Online Communication, Transactions of the Association for Computational Linguistics, vol. 4, Available online at: https://www.aclweb.org/anthology/Q16-1005.pdf, 2016, pp. 61-74.

(56) References Cited

OTHER PUBLICATIONS

Pennebaker et al., Linguistic Styles: Language Use as an Individual Difference, Journal of Personality and Social Psychology, vol. 77, No. 6, Dec. 1999, pp. 1296-1312.
Pennebaker, The Secret Life of Pronouns: What Our Words Say About Us, Bloomsbury Press, Aug. 31, 2011, 2 pages.
Pennington, Glove: Global Vectors for Word Representation, Proceedings of the Conference on Empirical Methods in Natural Language Processing, Association for Computational Linguistics, Available online at: https://www.aclweb.org/anthology/D14-1162.pdf, Oct. 2014, pp. 1532-1543.
Picard, Affective Computing, M.I.T Media Laboratory Perceptual Computing Section Technical Report No. 321, 1997, 16 pages.
Preotiuc-Pietro et al., Personality Driven Differences in Paraphrase Preference, Proceedings of the Second Workshop on Natural Language Processing and Computational Social Science, Association for Computational Linguistics, Available online at: https://pdfs.semanticscholar.org/fcf1/768cbcbefd28bb6b71e0ddfb158d3cfba720.pdf, Aug. 3, 2017, pp. 17-26.
Recchia et al., Reproducing Affective Norms with Lexical Co-occurrence Statistics: Predicting Valence, Arousal, and Dominance, The Quarterly Journal of Experimental Psychology, vol. 68, No. 8, 2015, pp. 1584-1598.
Ribeiro et al., SentiBench—A Benchmark Comparison of State-of-the-practice Sentiment Analysis Methods, EPJ Data Science, vol. 5, No. 1, Jul. 14, 2016, 21 pages.
Rosenthal et al., Semeval-2017 Task 4: Sentiment Analysis in Twitter, Proceedings of the 11th International Workshop on Semantic Evaluation, Association for Computational Linguistics, Available online at: https://www.aclweb.org/anthology/S17-2088.pdf, Aug. 3-4, 2017, pp. 502-518.
Rothe et al., Ultradense Word Embeddings by Orthogonal Transformation, Proceedings of the 2016 Conference of the North American Chapter of the Association for Computational Linguistics, Human Language Technologies, Available online at: https://www.aclweb.org/anthology/N16-1091.pdf, Jun. 12-17, 2016, pp. 767-777.
Rubenstein et al., Contextual Correlates of Synonymy, Communications of the ACM, vol. 8, No. 10, Oct. 1965, pp. 627-633.
Scherer et al., A Blueprint for Affective Computing: A Sourcebook and Manual, Oxford University Press, Inc., 1st Edition, 2010, 1-4 pages.
Sedoc et al., Predicting Emotional Word Ratings Using Distributional Representations and Signed Clustering, Proceedings of the 15th Conference of the European Chapter of the Association for Computational Linguistics, Available online at: https://www.aclweb.org/anthology/E17-2090.pdf, Apr. 3-7, 2017, pp. 564-571.
Sedoc et al., Semantic Word Clusters Using Signed Spectral Clustering, Proceedings of the 55th Annual Meeting of the Association for Computational Linguistics, Association for Computational Linguistics, vol. 1, Long Papers, Available online at: https://www.aclweb.org/anthology/P17-1087.pdf, Jul. 30-Aug. 4, 2017, pp. 939-949.
Sigley, Text Categories and Where You Can Stick Them: A Crude Formality Index, Journal of Corpus Linguistics, vol. 2, No. 2, Jan. 1997, pp. 1-4.
Socher et al., Recursive Deep Models for Semantic Compositionality Over a Sentiment Treebank, Proceedings of the Conference on Empirical Methods in Natural Language Processing, Association for Computational Linguistics, Available online at: https://www.aclweb.org/anthology/D13-1170.pdf, Oct. 18-21, 2013, pp. 1631-1642.
Vankrunkelsven et al., Predicting Lexical Norms Using a Word Association Corpus, Proceedings of the 37th Annual Conference of the Cognitive Science Society, Cognitive Science Society, 2015, pp. 2463-2468.
Vinyals et al., Show and Tell: a Neural Image Caption Generator, IEEE Conference on Computer Vision and Pattern Recognition, Jun. 7-15, 2015, pp. 3156-3164.
Vulic et al., Morphfitting: Fine-Tuning Word Vector Spaces with Simple Language-Specific Rules, Proceedings of the 55th Annual Meeting of the Association for Computational Linguistics, vol. 1, Long Papers, Available online at: https://arxiv.org/pdf/1706.00377.pdf, Jun. 1, 2017, 16 pages.
Wang, Community-Based Weighted Graph Model for Valence-Arousal Prediction of Affective Words, IEEE/ACM Transactions on Audio, Speech, and Language Processing, vol. 24, No. 11, Nov. 2016, pp. 1957-1968.
Warriner et al., Norms of Valence, Arousal, and Dominance for 13,915 English Lemmas, Behavior Research Methods, vol. 45, No. 4, Dec. 2013, pp. 1191-1207.
Wieting et al., From Paraphrase Database to Compositional Paraphrase Model and Back, Transactions of the Association for Computational Linguistics, vol. 3, Available online at: https://www.aclweb.org/anthology/Q15-1025.pdf, 2015, pp. 345-358.

\* cited by examiner

US 11,023,685 B2

AFFECT-ENRICHED VECTOR REPRESENTATION OF WORDS FOR USE IN MACHINE-LEARNING MODELS

TECHNICAL FIELD

This disclosure generally relates to natural language processing. More specifically, but not by way of limitation, this disclosure relates to facilitating natural language processing through enriched distributional word representations.

BACKGROUND

Natural language processing (NLP) is used in computing to translate text in natural language (i.e., language that is natural to a human user) into data useable by a computing system. Natural language processing is used, for example, in data analytics to enable users to input queries in their own words, in data mining to extract relevant information from large amounts of text, and in the field of automated personal assistants, where such assistants utilize natural language processing to interpret instructions from users and to analyze data sources for answers.

Natural language processing is sometimes facilitated by word distributions, each of which is a set of words, with each word represented by a vector, such that the various vectors are distributed throughout a space. A word distribution has a positioning of words relative to one another according to similar meaning, typically, for instance, based on the distributional hypothesis, specifically, that linguistic items used in similar contexts have similar meanings. Thus, words used in similar contexts are likely to be positioned proximate one another in a word distribution. Secondarily, some word distributions incorporate an aspect of semantic relations, such that words positioned close to each other have a relationship (e.g., synonyms or antonyms). NLP uses word distributions in various ways, such as to determine meanings of phrases, clauses, or sentences based on proximity of words to other words, phrases, clauses, or sentences for which meanings are known.

However, word distributions do not incorporate human reactions (e.g., affects) that go beyond mere semantics and definitions. Human communication includes information, opinions, and reactions. Reactions are often captured by affective messages in written as well as verbal communications. While there has been work in affect modeling and affective content generation, the area of affective word distributions remains unexplored. NLP is therefore not able to effectively interpret emotions or personality traits based on natural language. As a result, computers cannot respond in the most effective manner to user input that incorporates human reactions.

SUMMARY

The present disclosure includes systems and methods for facilitating natural language processing through enriched distributional word representations. In one example, a computing system receives an initial word distribution having initial word vectors that represent, within a multidimensional vector space, words in a vocabulary. A distance between a particular pair of initial word vectors in the multidimensional vector space corresponds to a semantic similarity between the represented pair of words. The system receives a human-reaction lexicon indicating human-reaction values respectively associated with words in the vocabulary. The system modifies the initial word vectors such that the distance between the pair of initial word vectors representing the pair of words is decreased according to a human-reaction similarity between the pair of words. The system outputs an enriched word distribution that includes an enriched word vector with the decreased distance, thereby representing the human-reaction similarity more accurately.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
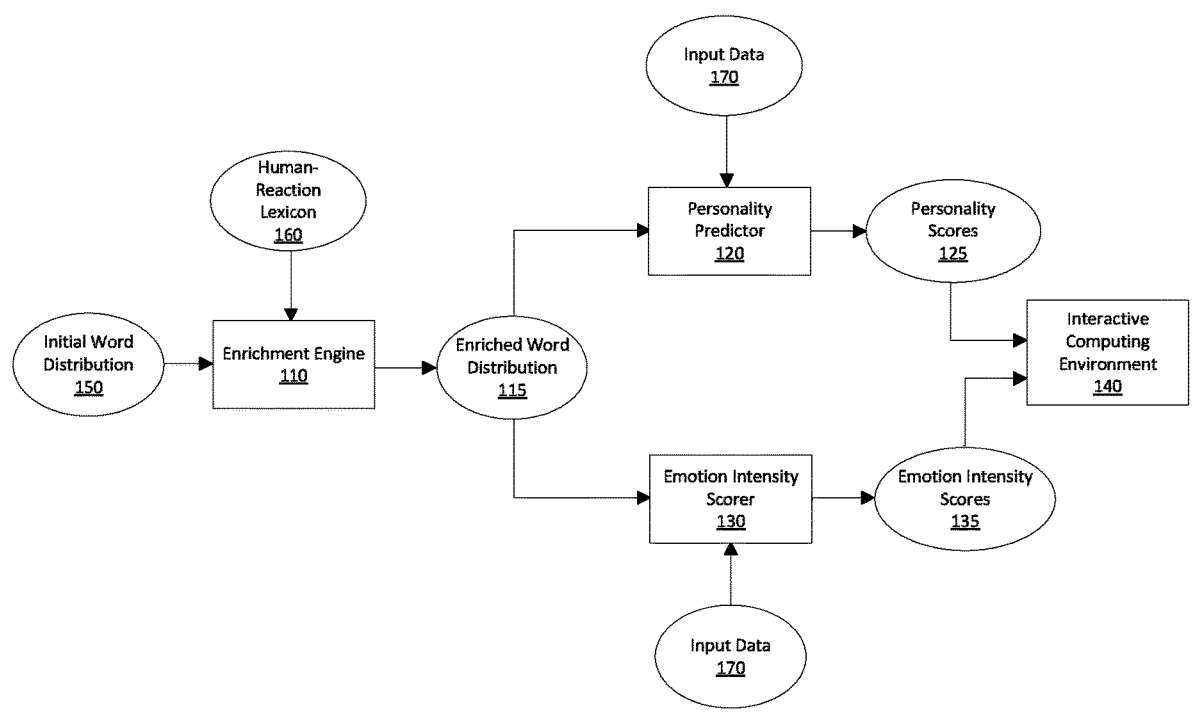
FIG. 1 depicts an example of a communications flow of an enrichment system, according to certain embodiments of the present disclosure.

The present disclosure includes systems and methods for facilitating natural language processing (NLP) through enriched distributional word representations. As explained above, conventional word distributions lack incorporation of human reactions, such as affect, which captures an emotional aspect of words. As a result, an interactive computing environment utilizing NLP cannot effectively respond to a user because that interactive computing environment cannot understand the human reactions implicit in user input or other textual data.

The following non-limiting example is provided to introduce certain embodiments. In this example, an enrichment engine executed by a computing device is used for generating enriched word distributions. The enrichment engine receives an initial word distribution, which includes a set of initial word vectors respectively representing a corresponding words in a vocabulary. Typically, the initial word distribution embeds some aspect of semantic relations, such that similar words are positioned in proximity to one another within the initial word distribution. However, the initial word distribution likely lacks a human-reaction aspect, such as affect. As a result, if a computing system utilizes the initial word distribution, the computing system is sometimes unable to distinguish between, for instance, the words "happy" and "sad," which are close together according to the distributional hypothesis because these words often appear in similar contexts. However, the words "happy" and "sad" have significantly different affects. For a further example, if this computing system were interpreting an email or generating text on demand to be presented to a user in an interactive computing environment, the computing system would be unable to properly distinguish between phrases utilizing these words.

Continuing with this example, the enrichment engine can address the lack of a human-reaction aspect. To do so, the enrichment engine further accesses a human-reaction lexicon indicating human-reaction values associated with words in the vocabulary. For instance, each word in the vocabulary is associated with a human-reaction value, such as a human-reaction vector. The human-reaction value associated with a word indicates, for instance, the affect of the word. Thus, in some embodiments, each word is represented by both an initial word vector and a human-reaction value, each of which describe the word. Typically, a pair of words in the vocabulary have a human-reaction similarity represented by a difference (e.g., a distance) between the respective human-reaction values of those words.

The enrichment engine, in this example, uses the human-reaction lexicon by modifying the initial word vectors such that the distance between a pair of initial word vectors, representing a pair of words in the vocabulary, is decreased according to the human-reaction similarity between the pair of words. As a result, if this modification applies to the initial word distribution as a whole, the positions of words are shifted (i.e., the initial word vectors are changed) according to the human-reaction lexicon to embed the human-reaction lexicon into the initial word distribution, resulting in an enriched word distribution. For example, in some embodiments, the enriched word distribution positions the words "happy" and "sad" farther away from each other, as compared to the initial word distribution, due to the incorporation of affect or some other human-reaction lexicon. As a result, a computer system utilizing the enriched word distribution is less likely to confuse the meanings of these two words.

The enriched word distribution includes a set of enriched word vectors corresponding to modified versions of the initial word vectors, and this enriched word distribution is output for analysis or use. In this manner, embodiments described herein utilize the enriched word distribution to predict personality traits or to score emotions, thereby enabling customization of an interactive computing environment based on affect-related aspects of a user.

Certain embodiments described herein improve NLP and, thus, improve interactive computing environments by incorporating a human-reaction lexicon into an existing initial word distribution to form an enriched word distribution. This enriched word distribution can be used by a personality predictor or an emotion intensity scorer to provide an effective interactive computing environment that accurately interprets human reactions behind words. Further, the analysis of affect in interpersonal communication (e.g., emails, chats, and longer articles), as can be achieved by embodiments described herein, is necessary for various applications, including the study of consumer behavior and psychology, understanding audiences and opinions in computational social science, and more recently for dialogue systems and conversational agents.

Additionally or alternatively, certain embodiments described herein facilitate using word distributions to predict personality traits and to score emotion intensities, which is useful at least in the technological field of natural language processing. To this end, some embodiments generate an enriched word distribution that incorporates a human-reaction lexicon representing, for example, affect. With this enriched word distribution, according to some embodiments, a personality predictor predicts the magnitude of various personality traits of an author of input data, or an emotion intensity score scores the intensities of one or more emotions. For example, and not by way of limitation, output of the personality predictor or the emotion intensity scorer can be used to customize interactive computing environments, to tailor marketing content, or to alert users of the potential impact of content being written or otherwise generated. For instance, if a user utilizes an interactive computing environment, that interactive computing environment can tailor itself to the author's personality so as to provide a positive and intuitive user experience. For instance, if a user converses with a conversational bot to address a customer service issue, to provide a query, or for some other purpose, the conversational bot can customize its responses based on the user's personality, which can lead to a more positive experience for the user. For another example, if a user utilizes an interactive computing environment, such as when typing an email, certain embodiments notify the author of the intensity of emotions reflected in the email being typed. As a result, the user can modify the email to reflect emotion intensities appropriate for the purpose of the email.

As used herein, the term "vocabulary" refers to an established collection of one or more words. A vocabulary need not include every known word in a language. However, a vocabulary can incorporate new words, or words can be removed from a vocabulary, over time. Examples of vocabularies include a set of words recognized by a spellchecker or a set of words for which word vectors are known.

As used herein, the term "word vector" refers to a variable representing a word and having one or more dimensions. Generally, a word vector is numerical and quantifies a word. Due to its dimensionality, a word vector is associated with a position in a space having the same number of dimensions as the word. For instance, in the case of a word vector with two dimensions, the word vector can be plotted in two dimensional space. As such, two word vectors can be said to have a distance between them, or a proximity, where that distance is equal to the absolute distance between the word vectors.

As used herein, the term "word distribution" refers to a distribution, or set, of word vectors. A set of word vectors, together representing a vocabulary, are distributed throughout space having a dimensionality matching the word vectors therein. Typically, a word distribution is based on co-occurrence or context and is based on the distributional hypothesis as follows: linguistic items with similar distributions have similar meanings. Thus, in a typical word distribution, words with similar meanings have similar representations and are therefore proximate.

As used herein, the term "semantics" refers to both the linguistic and philosophical study of meaning in language, as well as the relations between words according to their meanings.

As used herein, "affect" refers to the experience of a feeling, including emotions, sentiments, personality, and moods. This is in contrast to semantics, such that "semantics" captures the literal meaning of words while "affect" captures the feeling behind words. For example, while the terms "happy" and "ecstatic" have similar meanings and thus are closely related semantically, these two terms have vastly different feelings. Based on affect, it could be the case that the term "furious" is more closely related to "ecstatic" than is the term "happy," although furious and ecstatic can be considered antonyms. In at least one known affect lexicon, affect has three dimensions: valence, arousal, and dominance.

As used herein, the term "human-reaction value" refers to a value that captures an aspect of human reactions such as, feeling, emotion, sentiment, or personality. Generally, a human-reaction value is a numerical value in one or more dimensions. In some embodiments, a word is associated with, or corresponds to, a human-reaction value if that human-reaction value reflects a human reaction associated with the word.

As used herein, the term "human-reaction vector" refers a human-reaction value having one or more dimensions. As with vectors in general, a human-reaction vector has a direction and a magnitude in space, and thus, a human-reaction vector can be thought of as a position within space.

As used herein, the term "human-reaction lexicon" refers to a distribution of human-reaction values. As a whole, the human-reaction lexicon expresses feelings behind words in a vocabulary. One example of a human-reaction lexicon is an affect lexicon, in which each human-reaction value represents an affect, and each word is associated with and represented by a human-reaction value. If a word is associated with a particular human-reaction value, that human-reaction value is deemed to describe the affect of the word. More specifically, for instance, each human-reaction value in a human-reaction lexicon representing affect has three dimensions, respectively representing valence, dominance, and arousal.

As used herein, the term "enriched word distribution" refers to a word distribution that embeds, or incorporates, a human-reaction lexicon, as described herein. More specifically, given an initial word distribution and a human-reaction lexicon, an enriched word distribution is the result of incorporating that human-reaction lexicon into the initial word distribution, thus modifying the initial word distribution.

As used herein, the term "human-reaction similarity" refers to a measurement of similarity between a pair of human-reaction values and, further, between a pair of words associated with that pair of human-reaction values. For instance, "human-reaction similarity" equals or reflects a distance between a pair of human-reaction values within a human-reaction lexicon. In some embodiments, the relative positions of a pair of words in an enriched word distribution is based on both the positions of those words in an initial word distribution as well as the human-reaction similarity between the pair of words.

As used herein, the term "enriched word vector" refers to a word vector that belongs to an enriched word distribution. If a human-reaction lexicon is embedded, or incorporated, into an initial word distribution, each initial word vector is thereby mapped to a corresponding enriched word vector of the resulting enriched word distribution, as will be described in detail herein. Thus, an enriched word vector incorporates an aspect of human reactions.

As used herein, the term "enrichment engine" refers to a component configured to augment an initial word distribution with a human-reaction lexicon to generate an enriched word distribution, as described herein. In some embodiments, an enrichment engine is implemented as hardware, software, or a combination of both. For instance, the enrichment engine is a software module stored in a computer-readable medium for execution by a computer processor, or the enrichment engine is a specialized hardware circuit designed to operate as described herein.

As used herein, the term "personality predictor" refers to a component configured to predict (e.g., to score) one or more personality traits based on input data or, more specifically, based on a set of word vectors (e.g., enriched word vectors) representing words present in the input data. In some embodiments, a personality predictor is implemented as hardware, software, or a combination of both. For instance, the personality predictor is a software module stored in a computer-readable medium for execution by a computer processor, or the personality predictor is a specialized hardware circuit designed to operate as described herein. In some embodiments, machine learning is used to train the personality predictor to predict personality traits.

As used herein, the term "emotion intensity scorer" refers to a component configured to score one or more intensities of emotions based on input data or, more specifically, based on a set of word vectors (e.g., enriched word vectors) representing words present in input data. In some embodiments, an emotion intensity scorer is implemented as hardware, software, or a combination of both. For instance, the emotion intensity scorer is a software module stored in a computer-readable medium for execution by a computer processor, or the emotion intensity scorer is a specialized hardware circuit designed to operate as described herein. In some embodiments, machine learning is used to train the personality predictor to predict personality traits.

As used herein, the term "interactive computing environment" refers to an environment facilitated by, or provided by, a computing system, such that a computing system interacts with a user. For example, and not by way of limitation, a web-based or an application-based environment through which a computing system interacts with a user is an interactive computing environment.

FIG. 1 depicts an example of a communications flow of an enrichment system 100, according to certain embodiments of the present disclosure. As shown in FIG. 1, the enrichment system 100 includes an enrichment engine 110. Further, in some embodiments, the enrichment system 100 includes a personality predictor 120 or an emotion intensity scorer 130, or both. Generally, the enrichment engine 110 takes as input an initial word distribution 150 and a human-reaction lexicon 160 and outputs an enriched word distribution 115. More specifically, the enrichment engine 110 augments, or otherwise modifies, the initial word distribution 150 with the human-reaction lexicon 160 to result in the enriched word distribution 115. Generally, an initial word distribution 150 includes a set of initial word vectors representing words in a vocabulary, while the resulting enriched word distribution includes a set of enriched word vectors representing words in the vocabulary. Thus, a word in the vocabulary becomes represented by an initial word vector and, after the augmentation, also by an enriched word vector. However, the enriched word vector incorporates one or more human reactions based on the human-reaction lexicon 160.

In some embodiments, at least a portion of an enriched word distribution 115 acts as input for the personality predictor 120 or the emotion intensity scorer 130, or both. The enrichment engine 110 will be described in more detail below.

In certain embodiments, the personality predictor 120 receives input data 170, such as textual data, as well as an enriched word distribution 115 and outputs one or more personality scores 125. In the field of human personality, there are five established personality traits, or five dimensions of personality: extroversion, neuroticism, agreeableness, conscientiousness, and openness. In some embodiments, the personality predictor predicts (e.g., determines a score for) one or more of these specific personality traits in an author of the input data 170, based at least in part on the enriched word distribution 115. The personality predictor 120 will be described in more detail below.

Additionally or alternatively, the emotion intensity scorer 130 receives input data 170, such as textual data, as well as an enriched word distribution 115 and outputs one or more scores representing emotion intensities. More specifically, given an established set of emotions (e.g., anger, fear, joy, or sadness), the emotion intensity scorer 130 scores an intensity (i.e., an emotion intensity) of each such emotion reflected in the input data 170. The emotion intensity scorer 130 will be described in more detail below.

In some embodiments, output from the personality predictor 120 or the emotion intensity scorer 130 is utilized by an interactive computing environment 140. For instance, the interactive computing environment 140 tailors itself to a user based on the personality scores 125 or the emotion intensity scores 135. More specifically, for instance, if a user updates textual data, the emotion intensity scorer 130 generates updated emotion intensity scores 135, and the interactive computing environment 140 may notify the user of the intensities of emotions reflected in the updated textual data. For another example, based on user input analyzed by the personality predictor 120, the interactive computing environment 140 generates appropriate text (e.g., by selecting from available options of text) to the appeal to the user or to grab the user's attention based on the personality scores 125 describing the user's personality.

Figure 2:
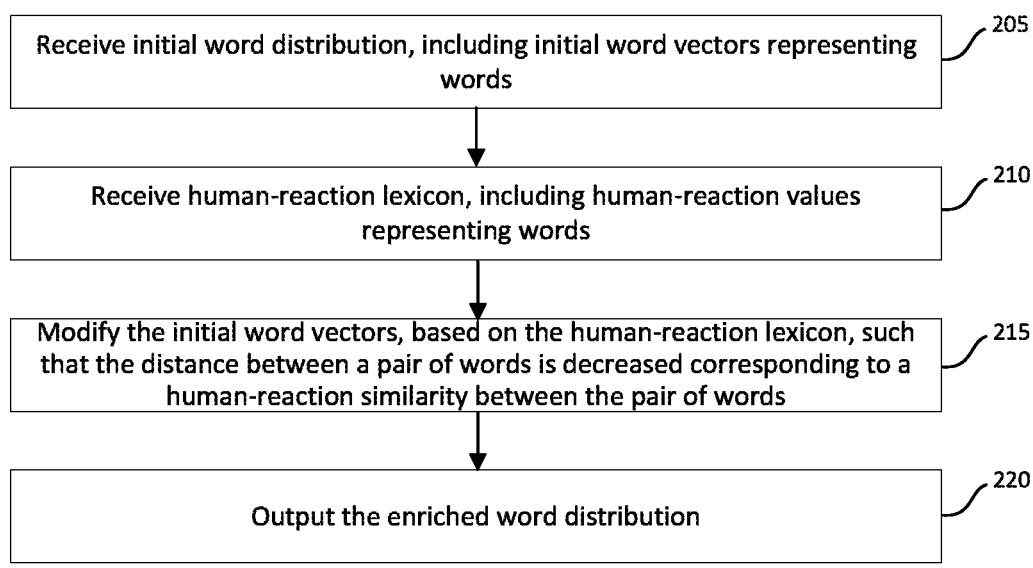
FIG. 2 depicts an example of a method of generating an enriched word distribution based on an initial word distribution and a human-reaction lexicon, according to certain embodiments of the present disclosure.

FIG. 2 depicts an example of a method 200 for generating an enriched word distribution 115 based on an initial word distribution 150 and a human-reaction lexicon 160, according to certain embodiments of the present disclosure. In some embodiments, this method 200 is performed by the enrichment engine 110.

As shown in FIG. 2, at block 205, the enrichment engine 110 receives an initial word distribution 150. The initial word distribution 150 includes a set of initial word vectors, each representing a word in a vocabulary. Within the initial word distribution 150 is a pair of initial word vectors, specifically a first initial word vector and a second initial word vector, representing a pair of words, specifically a first word and a second word. In the initial word distribution 150, this pair of initial word vectors has a distance between them that reflects an initial similarity, specifically, for instance, their semantic similarity.

At block 210, the enrichment engine 110 receives a human-reaction lexicon 160. The human-reaction lexicon 160 includes a set of human-reaction values, where reach word in the vocabulary is represented by one such human-reaction value. In some embodiments, each human-reaction value is a human-reaction vector having two or more dimensions. For example, the human-reaction lexicon 160 is an affect lexicon such that each human-reaction value reflects an affect of the corresponding word. In an example of such a human-reaction lexicon 160, each human-reaction value is a numerical three-dimensional value, with the three dimensions respectively representing the elements of valence, arousal, and dominance. In this example, each dimension holds a value in the range of [1, 9], inclusive, where a higher number indicates a higher intensity in the corresponding element, and where a value of 1 indicates low intensity, a value of 5 indicates moderate intensity, and value of 9 indicates high intensity.

At block 215, the enrichment engine 110 modifies the initial word distribution 150 based on the human-reaction lexicon 160, or in other words, the enrichment engine 110 augments the initial word distribution 150 with the human-reaction lexicon 160, thereby embedding the human-reaction lexicon 160. This modification is such that the distance between the pair of initial word vectors words mentioned above is changed (e.g., increased or decreased) based on a human-reaction similarity between the words represented by the pair of initial word vectors. According to the human-reaction lexicon 160, the first word is represented by a first human-reaction value, and the second word is represented by a second human-reaction value. The human-reaction similarity corresponds to a difference between these human-reaction values. For instance, the human-reaction similarity is a scalar value equal to, or otherwise representing, a distance between a first human-reaction vector representing the first word and a second human-reaction vector representing the second word. In some embodiments, if the initial word distribution 150 is modified, the distance between the first initial word vector and the second initial word vector is thus modified based on this human-reaction similarity between the first word and the second word. Various mechanisms of modifying the initial word distribution 150 based on the human-reaction lexicon 160 are described in detail below.

The result of the above modification is the generation of an enriched word distribution 115, which includes a set of enriched word vectors corresponding to the initial word vectors. In some embodiments, there is a one-to-one correspondence between enriched word vectors and initial word vectors, and each enriched word vector represents the same word represented by the corresponding initial word vector In some embodiments, the enriched word distribution 115 is output. For instance, the enriched word distribution 115 is output to the personality predictor 120 or to the emotion intensity scorer 130, or the enriched word distribution is output to storage for later use.

Figure 3:
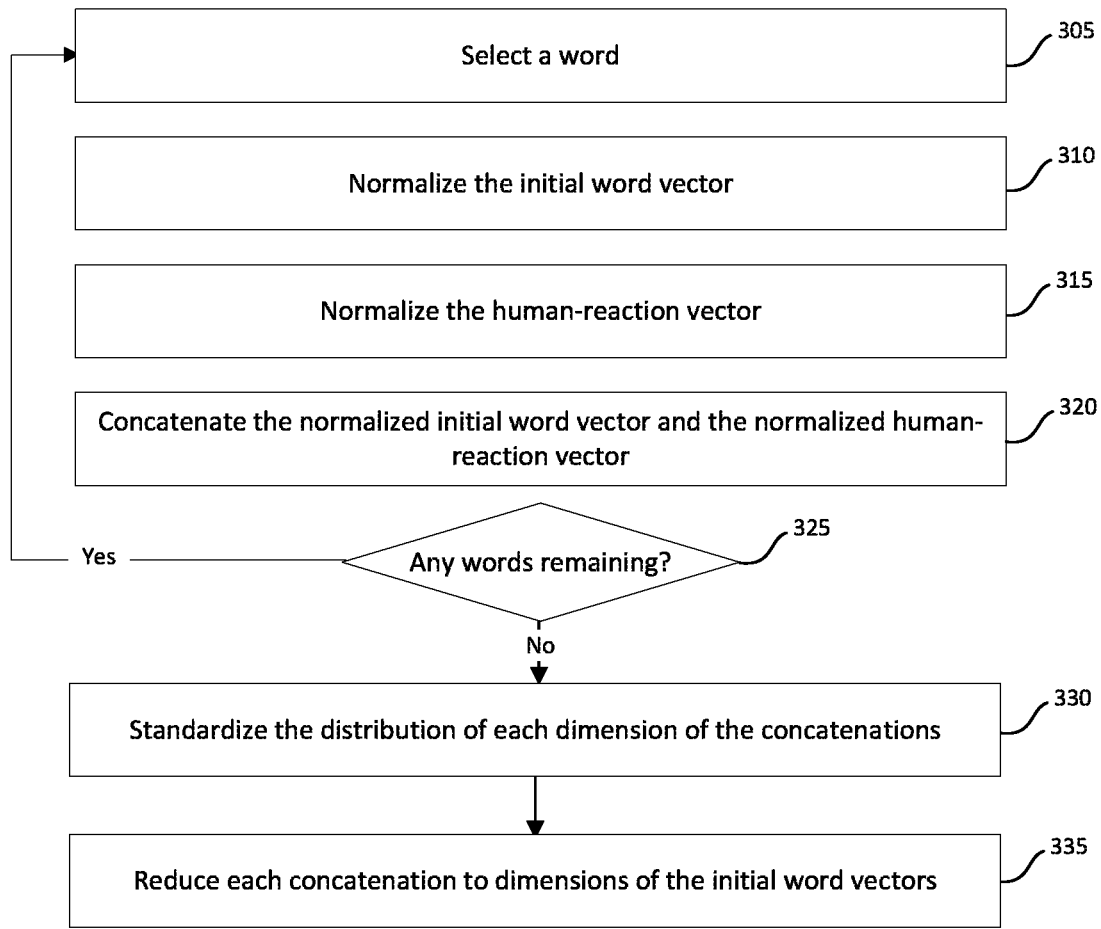
FIG. 3 depicts an example of a method of concatenating human-reaction information with the initial word distribution to generate the enriched word distribution, according to certain embodiments of the present disclosure.
Figure 4:
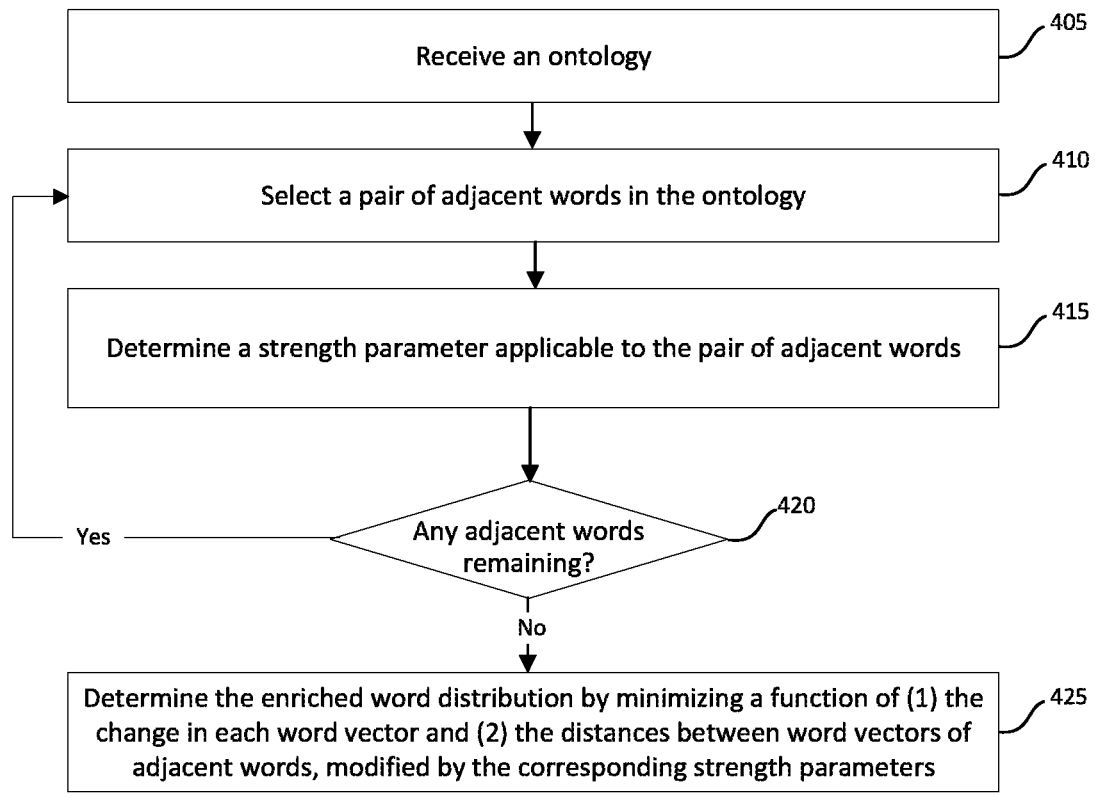
FIG. 4 depicts an example of a method of integrating the human-reaction lexicon into the initial word distribution as a strength factor applicable to an ontology defining relations between words, according to certain embodiments of the present disclosure.
Figure 5:
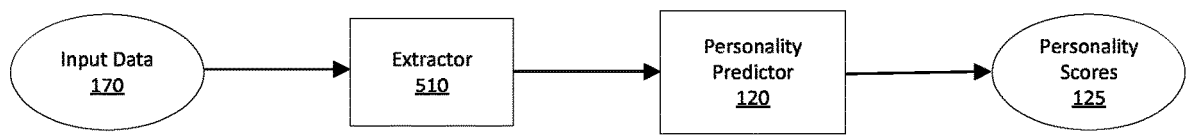
FIG. 5 depicts a communications flow applicable to a personality predictor that utilizes an enriched word distribution, according to certain embodiments of the present disclosure.

As mentioned above, the enrichment engine 110 can use various mechanisms to augment the initial word distribution 150, thereby generating the enriched word distribution 115. FIG. 3 and FIG. 4 illustrate examples of such mechanisms.

FIG. 3 depicts an example of a method 300 of concatenating, or appending, human-reaction information, specifically human-reaction vectors, with the initial word distribution 150 to generate the enriched word distribution 115, according to certain embodiments of the present disclosure. Given an initial word distribution 150 and a human-reaction lexicon 160, in some embodiments, the enrichment engine 110 follows this method 300 to generate the enriched word distribution 115.

As shown in FIG. 3, at block 305, the enrichment engine 110 selects a word from among the words of the vocabulary that are represented as initial word vectors. As will be described below, the enrichment engine 110 performs an iterative loop over the various words represented in the initial word distribution 150. In some embodiments, the order in which the words are selected does not matter.

At block 310, the enrichment engine 110 normalizes the initial word vector representing the selected word. In some embodiments, this act of normalization ensures that the initial word vector is unit length. For example, and not by way of limitation, to normalize the initial word vector, each dimension of the initial word vector is divided by the square root of the sum of the squares of the values in such dimensions. If the number of dimensions of each initial word vector is D, then for each initial word vector $x_i$ in the initial word distribution 150, X, normalizing the initial word vector is performed as follows, in some embodiments, where $\bar{e}_i$ is the normalized initial word vector:

$$\bar{x}_i = \frac{x_i}{\sqrt{\sum_{k=1}^{D} x_{ik}^2}}$$

At block 315, the enrichment engine 110 normalizes the human-reaction vector representing the selected word. This act of normalization ensures that the human-reaction vector is unit length. For example, and not by way of limitation, to normalize the human-reaction vector, each dimension of the human-reaction vector is divided by the square root of the sum of the squares of the values in such dimensions. If the number of dimensions of each human-reaction vector is F, then for each human-reaction vector $a_i$ in the human-reaction lexicon 160, normalizing the human-reaction vector is performed as follows, in some embodiments, where $\bar{a}_i$ is the normalized human-reaction vector:

$$\bar{a}_i = \frac{a_i}{\sqrt{\sum_{k=1}^{F} a_{ik}^2}}$$

At block 320, the enrichment engine 110 concatenates the normalized initial word vector for the selected sword and the normalized human-reaction vector for the selected word, resulting in a concatenation. In some embodiments, the concatenation has a quantity of dimensions, D+F, equal to the quantity of dimensions, D, of the initial word vector and the quantity of dimensions, F, of the human-reaction vector.

At decision block 325, the enrichment engine 110 determines whether another word exists that has not yet been selected. In other words, the enrichment engine 110 determines whether the above iteration has been performed for each word for which an initial word vector is known. If an additional word exists, then the method 300 returns to block 305, where a word that has not yet been selected is selected. Otherwise, the iterations end, and the method 300 proceeds to block 330. At the conclusion of the iterations, there exists a set of concatenations generated throughout the iterations, where each word represented by an initial word vector is further represented by a respective concatenation that combines both the corresponding normalized initial word vector and the corresponding normalized human-reaction vector.

At block 330, in some embodiments, the enrichment engine 110 standardizes the distribution of each dimension of the concatenations representing the various words, to achieve standard normal distribution. More specifically, for instance, for each dimension of the D+F dimensions of the concatenations, the enrichment engine 110 transforms the values in that dimension so as to set the variance of the dimension to a value of 1 and to set the mean to a value of 0. In some embodiments, the value in each dimension $y_i$ of each concatenation y is modified as follows, where $\mu_i$ and $\sigma_i$ respectively represent the mean and standard deviation of that dimension across the set of concatenations:

$$y_i = \frac{y_i - \mu}{\sigma}$$

At block 335, in some embodiments, the enrichment engine 110 reduces each concatenation to the dimensions of the initial word vectors. In other words, each concatenation initially has D+F dimensions, and the concatenations are each reduced so as to have only D dimensions, thereby matching the dimensionality of the initial word vectors. For example, and not by way of limitation, the enrichment engine 110 utilizes principal component analysis to reduce each concatenation. The resulting reduced concatenation is the enriched word vector representing the word represented by the concatenation and, further, represented by the initial word vector and the human-reaction vector making up that concatenation. This enriched word distribution 115 thus embeds the human-reaction lexicon 160 by incorporating the respective human-reaction vector into each enriched word vector.

FIG. 4 depicts an example of a method 400 of integrating the human-reaction lexicon 160 into the initial word distribution 150 as a strength factor applicable to an ontology defining relations between words, according to certain embodiments of the present disclosure. Like the method 300 of FIG. 3, in some embodiments, this method 400 of FIG. 4 is performed by the enrichment engine 110 as a means to augment the initial word distribution 150 with the human-reaction lexicon 160.

As shown in FIG. 4, at block 405, the enrichment engine 110 receives an ontology. The ontology may be, or may be represented by, an ontological graph in which words are nodes and relations are edges, such that an edge between two words (i.e., adjacent words) indicates the existence of a relation between those two words. Thus, adjacent words in the ontology are deemed related words. As mentioned above, the initial word distribution 150 may already incorporate an ontology. In some embodiments, however, the ontology received at block 405 is not yet incorporated into the initial word distribution; in other embodiments, however, the ontology received is already incorporated into the initial word distribution 150. In either case, the enrichment engine 110 utilizes the ontology as described below, resulting in augmentation of the initial word distribution 150. In some embodiments, as a result of utilizing the ontology, the antonym and synonym relationships among words are incorporated with a weight that is based on the human-reaction lexicon 160.

At block 410, the enrichment engine 110 selects a pair of adjacent words from the ontology, such as by selecting an edge from the ontological graph. As will be described below, the enrichment engine 110 performs an iterative loop over the various pairs of adjacent words represented in the ontology. In some embodiments, the order in which the pairs are selected does not matter.

At block 415, the enrichment engine 110 determines a strength parameter applicable to the pair of adjacent words. In some embodiments, the enriched word vectors that result are adjusted from the initial word vectors based in part on strength parameters applicable to the pairings of adjacent words, such that the enriched word vector is based on weighted distances between the human-reaction vector of each word and the human-reaction vectors of the various adjacent words according to the ontology. This will be described in more detail below. Determining the strength parameter for a pair of adjacent words can be performed in various ways, examples of which are described below.

Suppose $W=\{w_1, w_2, \ldots, w_n\}$ is a vocabulary of words for which an initial word vector is known for each word, and suppose $\Omega$ is the ontology defining relations between words, where E is the set of edges representing relations in the ontology. In some embodiments, the value of the strength parameter (i.e., the strength of the relationship between the pair of words), S, applicable to the pair $w_i$ and $w_j$ is given by the following:

$$S(w_i, w_j) = 1 - \frac{\|a_i - a_j\|}{\sqrt{\sum_{f=1}^{F} \text{max\_dist}_f^2}}$$

In the above formula, $a_i$ and $a_j$ are the respective human-reaction vectors corresponding to the words $w_i$ and $w_j$, $\|a_i - a_j\|$ is the distance between vectors $a_i$ and $a_j$, and $\text{max\_dist}_f$ is the maximum distance in the $f^{th}$ dimension between any two human-reaction vectors. Thus, for example, for a conventional valence-arousal-dominance dimension of a human-reaction vector representing affect, the max_dist is 9−1=8, because 9 is the maximum possible value and 1 is minimum possible value in that dimension.

In some other embodiments, however, the value of the strength parameter is calculated for each dimension individually. More specifically, strength is determined separately for each dimension, f of the human-reaction vectors, and the strength parameter is defined as a scalar combination of the values across the various dimensions. For instance, in some embodiments, the strength parameter applicable to a pair of adjacent words is calculated as follows, where $a_{if}$ and $a_{jf}$ are the $f^{th}$ dimension of the respective affects of words $w_i$ and $w_j$:

$$S_f(w_i, w_j) = \frac{|a_{if} - a_{jf}|}{\text{max\_dist}_f}$$

$$S(w_i, w_j) = \sum_{f=1}^{F} S_f(w_i, w_j)$$

At decision block 420, the enrichment engine 110 determines whether another pair of adjacent words exists that has not yet been selected. In other words, the enrichment engine 110 determines whether the above iteration has been performed for each pair of adjacent words (i.e., each edge) in the ontology. If an additional such pair exists, then the method 400 returns to block 405, where a pair of adjacent words that has not yet been selected is selected. Otherwise, the iterations end, and the method 400 proceeds to block 425. At the conclusion of the iterations, a strength parameter has been calculated for each pair of adjacent words in the ontology.

At block 425, the enrichment engine 110 determines the enriched word distribution 115 based on the strength parameters. In some embodiments, this is performed by fitting (e.g., retrofitting or counterfitting) the initial word distribution 150 to the ontology with weighting (e.g., using the strength parameters) based on the human-reaction lexicon 160. In other words, the enrichment engine determines the enriched word distribution 115, $Q=\{q_1, q_2, \ldots, q_n\}$, such that the resulting enriched word vectors are both close to their counterparts in the initial word distribution 150, $\hat{Q}$, and to adjacent words according to the ontology $\Omega$. The distance between a pair of vectors is defined to be Euclidean; thus, in some embodiments, the enrichment engine 110 calculates the enriched word distribution 115 by minimizing the following function of Q, thereby retrofitting the initial word distribution to the ontology:

$$\Psi(Q) = \Sigma_{i=1}^{n}[\alpha_i \|q_i - \hat{q}_i\|^2 + \Sigma_{(i,j) \in E} \beta_{ij} \|q_i - q_j\|^2]$$

In the above function, $\alpha$ and $\beta$ are parameters (e.g., hyper-parameters) that control the relative weights of the two associations (i.e., the association between an enriched word vector and its corresponding initial word vector for the same word and the association between adjacent words). Further, in the above, $\Psi$ is a convex function in Q, and in some embodiments, the global optimal solution of $\Psi(Q)$ is determined through an iterative update method. For instance, by setting $$\frac{\partial \Psi(Q)}{\partial q_i} = 0,$$

iterative online updates are performed as follows:

$$q_i = \frac{\sum_{j:(i,j) \in E} \beta_{ij} q_j + \alpha_i \hat{q}_i}{\sum_{j:(i,j) \in E} \beta_{ij} + \alpha_i}$$

In some embodiments, $\beta_{ij}$ is defined based on the strength parameter $S(w_i, w_j)$, such that the parameter $\beta_{ij}$ incorporates the strength of a human-reaction similarity (e.g., an affective similarity) between the words $w_i$ and $w_j$. For example, and not by way of limitation, a set of $\beta_{ij}$ are established and are then normalized based on the corresponding strength parameters as follows: $\beta_{ij} = \beta_{ij} \times S(w_i, w_j)$.

Thus, at the conclusion of the method 400, the enrichment engine 110 has generated each enriched word vector of the enriched word distribution 115.

Although the methods shown and described above for augmenting the initial word distribution 150 are shown and described as distinct mechanisms, it will be understood by one skilled in the art that the methods of FIG. 3 and FIG. 4 can be combined. For example, and not by way of limitation, the method 400 of FIG. 4 is performed to generate the enriched word distribution 115 through retrofitting based on strength parameters, as described in FIG. 4, and then, for each enriched word vector, the corresponding human-reaction vector is concatenated and the result is reduced, as described in FIG. 3. It will be further understood that either of these methods may be combined with known mechanisms of fitting (e.g., retrofitting or counterfitting) word vectors to an ontology or to another space. For instance, after an act of fitting is performed on a word distribution, the enrichment engine 110 augments the resulting word distribution with a human-reaction lexicon 160 by concatenating the corresponding human-reaction vectors as per the method 300 described above.

Figure 6:
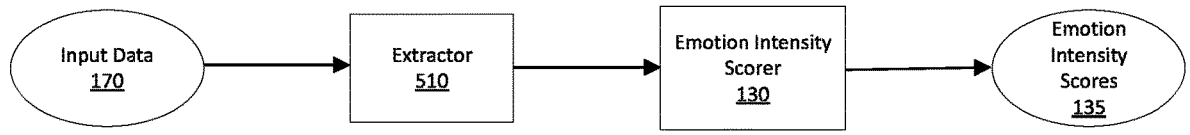
FIG. 6 depicts a communications flow applicable to an emotion intensity scorer that utilizes an enriched word distribution, according to certain embodiments of the present disclosure.

FIG. 6 depicts a communications flow applicable to the personality predictor 120 utilizing an enriched word distribution 115, according to certain embodiments of the present disclosure. In some embodiments, the enrichment engine 110 generates an enriched word distribution 115 on demand at the request of the personality predictor 120 or of a manager or agent of the personality predictor 120, optionally with a human-reaction lexicon 160 or an initial word distribution 150 specifically selected for the personality predictor 120. In some other embodiments, however, the personality predictor 120 utilizes an existing enriched word distribution previously generated by the enrichment engine 110 or otherwise.

In machine learning, prediction models are trained to map feature sets to labels. In some embodiments, the personality predictor 120 is a prediction model, such as a neural network, a random forest, or some other prediction model. More specifically, for instance, the personality predictor is a convolutional neural network (CNN) that has been previously trained on training sets that include feature sets and corresponding labels. During training, which occurs offline in some embodiments, the personality predictor 120 is trained given multiple training sets, each training set including a feature set and a label set having one or more labels, where each label corresponds to a score of a particular personality trait. In some embodiments, the quantity of dimensions of the label set (i.e., the number of labels in the label set) during training is equal to the number of personality traits, or personality dimensions, for which predictions (e.g., scores) are desired during operation.

In the field of personality study, there are sometimes considered to be five personality traits: extroversion, neuroticism, agreeableness, conscientiousness, and openness. In some embodiments, the personality predictor 120 is trained for these five personality traits, in which case the training sets provided each include a feature set, including enriched word vectors, and a label set, including a score for each of the five personality traits. As a result, the personality predictor 120 is trained to receive as input a feature set of enriched word vectors extracted from input data 170 and to output a label set of scores for the five personality traits.

Thus, in some embodiments, an extractor 510 extracts words from input data 170 and maps those words to their corresponding enriched word vectors. Having been trained already, the personality predictor 120 receives as input the enriched word vectors of words extracted from the input data 170, and the personality predictor 120 outputs a label set that includes a prediction, such as one or more personality scores 125, each personality score 125 corresponding to each personality trait on which the personality predictor 120 was trained. As a result, the personality predictor 120 is useful for analyzing input data 170 to determine the personality of an author of such input data 170.

FIG. 6 depicts a communications flow applicable to the emotion intensity scorer 130 utilizing an enriched word distribution 115, according to certain embodiments of the present disclosure. In some embodiments, the enrichment engine 110 generates an enriched word distribution 115 on demand at the request of the emotion intensity scorer 130 or of a manager or agent of the emotion intensity scorer 130, optionally with a human-reaction lexicon 160 or an initial word distribution 150 specifically selected for the emotion intensity scorer 130. In some other embodiments, however, the emotion intensity scorer 130 utilizes an existing enriched word distribution 115 previously generated by the enrichment engine 110 or otherwise.

In some embodiments, the emotion intensity scorer 130 is a prediction model and, optionally, is made up one or more prediction models in series. For instance, the emotion intensity scorer 130 is a neural network, a random forest, or some other prediction model. More specifically, for instance, the emotion intensity scorer 130 is a bidirectional long short-term memory (BiLSTM) CNN trained on training sets, each of which includes input data, a feature set including enriched word vectors extracted from the input data 170, and a corresponding label set. Each label in a label set corresponds to a score, or an intensity, of a particular emotion. In some embodiments, the quantity of dimensions of the label set (i.e., the number of labels in the label set) during training is equal to the number of emotions for which predictions (e.g., scores) are desired during operation. In some embodiments, the emotion intensity scorer 130 is trained offline.

Figure 7:
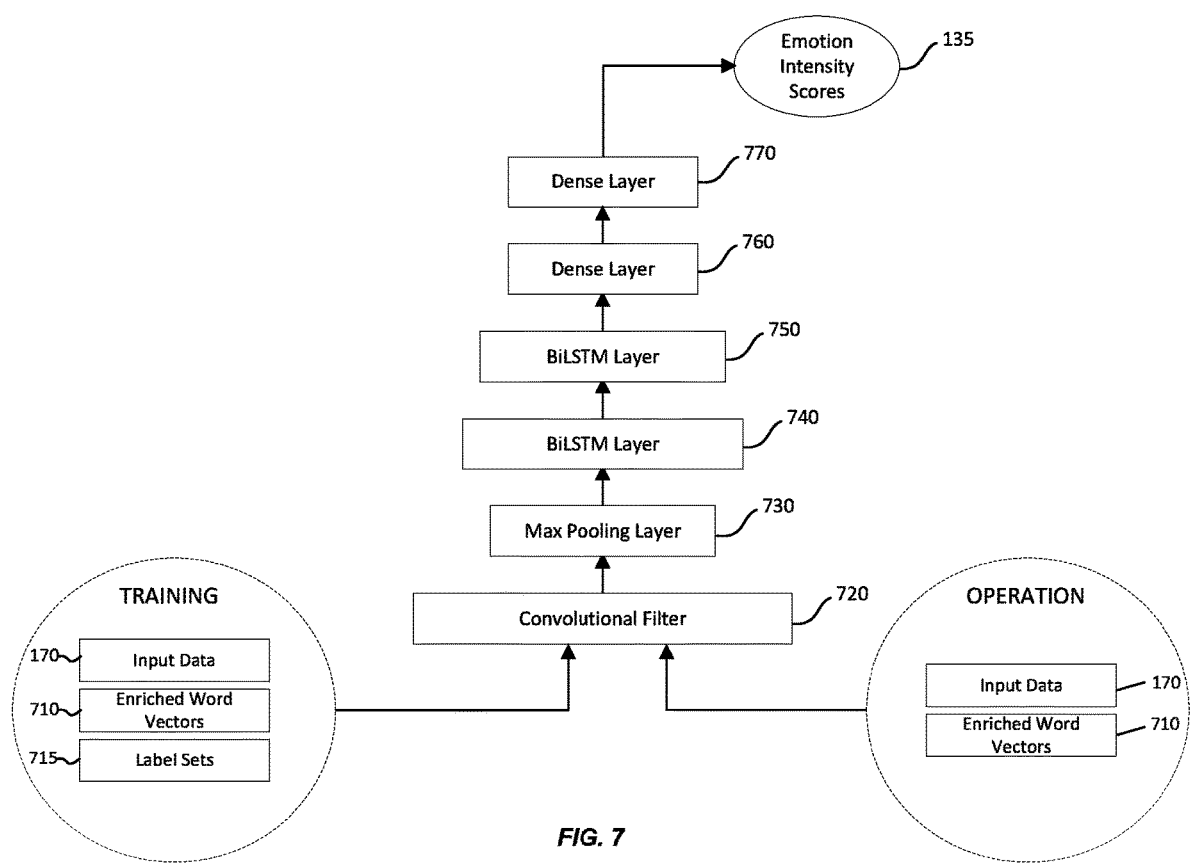
FIG. 7 depicts a communications flow applicable to training and operating the emotion intensity scorer, according to certain embodiments of the present disclosure.

FIG. 7 depicts a communications flow applicable to training and operating the emotion intensity scorer 130, according to certain embodiments of the present disclosure. As shown in FIG. 7, in some embodiments, the emotion intensity scorer 130 includes some or all of the following layers: a convolutional filter 720 (e.g., a one-dimensional convolution filter), a max pooling layer 730, a first BiLSTM layer 740, a second BiLSTM layer 750, a first dense layer 760, and a second dense layer 770. In some embodiments, the first BiLSTM layer 740 and the second BiLSTM layer 750 each analyze the input data 170 left-to-right and right-to-left to gain an understanding of how the words within the input data 170 relate to one another in context. Through taking as input the output of the first BiLSTM layer 740, the second BiLSTM layer 750 is able to gain a contextual understanding of long-distance relationships among words in the input data 170.

More specifically, for instance, output from the convolutional filter 720 is input to the max pooling layer 730, output from the max pooling layer 730 is input to the first BiLSTM layer 740, output from the first BiLSTM layer 740 is input to the second BiLSTM layer 750, output from the second BiLSTM layer 750 is output to the first dense layer 760, and output from the first dense layer 760 is input to the second dense layer 770. In some embodiments, the convolutional filter 720 performs one-dimensional convolution with 200 filters, a kernel size of 3, and rectified linear unit (ReLU) activation; the max pooling layer 730 performs max pooling with a pool size of 2 and a dropout of 0.3; the first BiLSTM layer 740 learns bidirectional long short-term dependencies between terms in sequence data (e.g., a sequence of words in input data 170) with 150 units, a dropout of 0.2, and ReLU activation; the second BiLSTM utilizes 80 units rather than 150; the first dense layer 760 has a size of 50 with a dropout of 0.3 and ReLU activation; and the second dense layer 770 has a size of 1. It will be understood, however, that the above example arrangement of layers and filters is not limiting but is provided for illustrative purposes only. Further, given the above arrangement, the output is a single score for a single emotion intensity. If multiple scores are desired for multiple corresponding emotions, then the size of the second dense layer 770 is adjusted to match the desired quantity of outputs, both during training and during operation of the emotion intensity scorer 130.

As mentioned above, training the emotion intensity scorer 130 includes submitting, to the emotion intensity scorer 130 acting as a prediction model, a plurality of training sets, where each training set includes input data 170, enriched word vectors 710 extracted from the input data 170, and a label set 715 including a score for each emotion on which the emotion intensity scorer 130 is being trained. During operation, the emotion intensity scorer 130 receives input data 170 along with enriched word vectors 710 representing words extracted from the input data 170, and the emotion intensity scorer 130 predicts and outputs a label set 715 including one or more emotion intensity scores 135 representing intensities of particular emotions as represented in the input data 170.

Thus, referring back to FIG. 6, in some embodiments, an extractor 510 extracts words from the input data 170 and maps those words to their corresponding enriched word vectors 710. Having been trained already, the emotion intensity scorer 130 receives the input data 170 and the enriched word vectors 710 of words extracted from the input data 170, and the emotion intensity scorer 130 outputs a label set 715 that includes a prediction, such as an emotion intensity score 135, corresponding to each emotion on which the emotion intensity scorer 130 was trained. As a result, the emotion intensity scorer 130 is useful for analyzing input data 170 to determine the intensity of emotions expressed therein.

Figure 8:
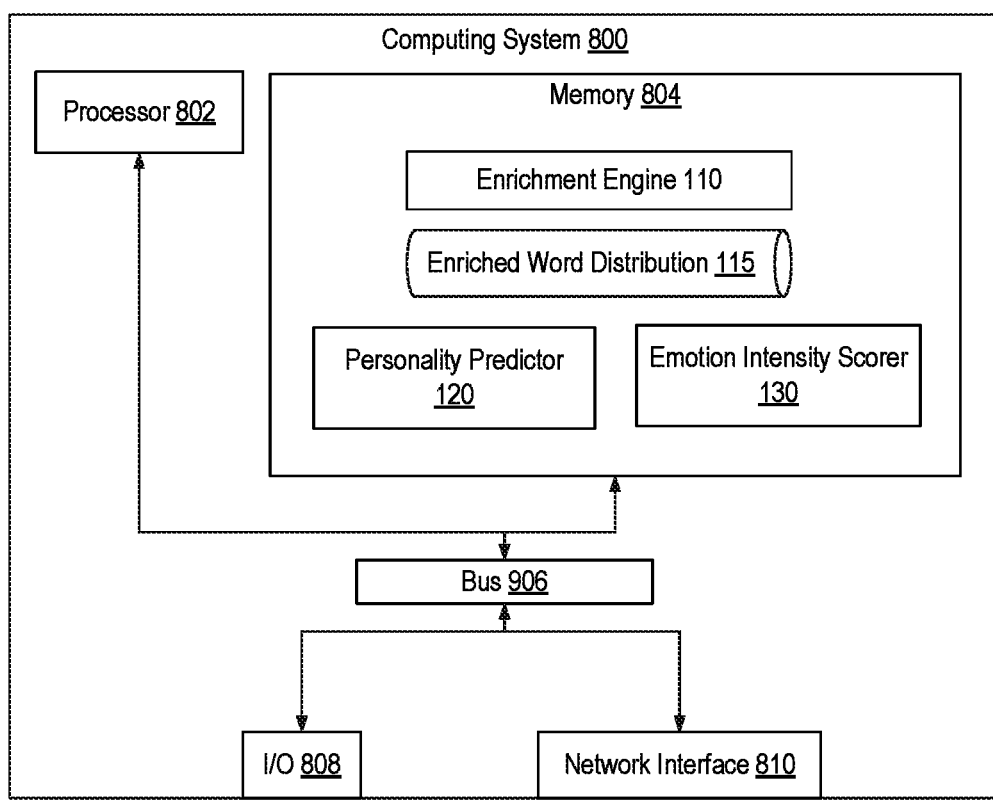
FIG. 8 depicts an example of a computing system that performs certain operations described herein, according to certain embodiments of the present disclosure.

FIG. 8 depicts an example of a computing system 800 that performs certain operations described herein, according to certain embodiments of the present disclosure. While FIG. 8 is provided for illustrative purposes, it will be understood that any suitable computing system or group of computing systems can be used for performing the operations described herein. For example, FIG. 8 depicts examples of a computing system 800 that executes an enrichment engine 110 to produce an enriched word distribution 115. In some embodiments, the computing system 800 also executes at least one of a personality predictor 120 and an emotion intensity scorer 130, as depicted in FIG. 8. In other embodiments, a separate computing system having devices similar to those depicted in FIG. 8 (e.g., a processor, a memory, etc.) executes the personality predictor 120, the emotion intensity scorer 130, or both.

The depicted example of a computing system 800 includes a processor 802 communicatively coupled to one or more memory devices 804. The processor 802 executes computer-executable program code stored in a memory device 804, accesses information stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices, including a single processing device.

The memory device 804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 800 may also include a number of external or internal devices, such as input or output devices. For example, the computing system 800 is shown with one or more input/output ("I/O") interfaces 808. An I/O interface 808 can receive input from input devices or provide output to output devices. One or more buses 806 are also included in the computing system 800. The bus 806 communicatively couples one or more components of a respective one of the computing system 800.

The computing system 800 executes program code that configures the processor 802 to perform one or more of the operations described herein. The program code includes, for example, the enrichment engine 110, the personality predictor 120, the emotion intensity scorer 130, or other suitable applications that perform one or more operations described herein. The program code may be resident in the memory device 804 or any suitable computer-readable medium and may be executed by the processor 802 or any other suitable processor. In some embodiments, one or more of the enrichment engine 110, the personality predictor 120, and the emotion intensity scorer 130 are stored in the memory device 804, as depicted in FIG. 8. In additional or alternative embodiments, one or more of the enrichment engine 110, the personality predictor 120, and the emotion intensity scorer 130 are stored in different memory devices of different computing systems. In additional or alternative embodiments, the program code described above is stored in one or more other memory devices accessible via a data network. In additional or alternative embodiments, rather than being implemented as program code, one or more of the enrichment engine 110, the personality predictor 120, and the emotion intensity scorer 130 are implemented as hardware circuits installed on the computing system 800, or otherwise useable by the computing system 800.

The computing system 800 can access one or more of the enrichment engine 110, the personality predictor 120, and the emotion intensity scorer 130 in any suitable manner. In some embodiments, some or all of one or more of these data sets, models, and functions are stored in the memory device 804, as in the example depicted in FIG. 8. For example, a computing system 800 that executes the personality predictor 120 or the emotion intensity scorer 130 can provide access to a previously generated enriched word distribution 115 or to the enrichment engine 110 to generate a new enriched word distribution 115 on demand. In additional or alternative embodiments, one or more of these data sets, models, and functions are stored in the same memory device (e.g., one of the memory device 804). For example, a web server in the form of the computing system 800 can host an enriched word distribution 115 and at least one of the personality predictor 120 and the emotion intensity scorer 130, such that the web server is able to provide an interactive computing environment 140 for remote users.

The computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and the like. The computing system 800 is able to communicate with one or more other computing devices (e.g., a computing device executing a personality predictor 120 or an emotion intensity scorer 130), such as the example web server described above, via a data network using the network interface device 810.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method in which one or more processing devices perform operations comprising:
   receiving an initial word distribution comprising a plurality of initial word vectors in a multidimensional vector space, each initial word vector in the plurality of initial word vectors comprising a first respective numerical value in each dimension of the multidimensional vector space and representing a respective word in a vocabulary, wherein a distance between a pair of initial word vectors in the multidimensional vector space corresponds to a semantic similarity between a pair of words represented by the pair of initial word vectors;
   receiving a human-reaction lexicon indicating human-reaction values respectively associated with words in the vocabulary; and
   mapping the plurality of initial word vectors to a plurality of enriched word vectors based on the human-reaction lexicon, each enriched word vector in the plurality of enriched word vectors comprising a second respective updated numerical value in each dimension of the multidimensional vector space, wherein mapping the plurality of initial word vectors to the plurality of enriched word vectors comprises:
   modifying the plurality of initial word vectors such that the distance between the pair of initial word vectors representing the pair of words is decreased according to a human-reaction similarity, determined from the human-reaction lexicon, between the pair of words; and
   outputting an enriched word distribution comprising the plurality of enriched word vectors, wherein the plurality of enriched word vectors include a pair of enriched word vectors representing the pair of words and having the decreased distance corresponding to the human-reaction similarity.

2. The method of claim 1, wherein modifying the plurality of initial word vectors comprises moving a first initial word vector representing a first word closer to a second initial word vector representing a second word, based on proximity of a first human-reaction vector representing the first word to a second human-reaction vector representing the second word.

3. The method of claim 1, the operations further comprising scoring one or more personality traits of an author of textual data, based on the enriched word distribution.

4. The method of claim 3, the operations further comprising:
   receiving the textual data as user input comprising one or more words; and
   generating interactive content responsive to the user input, based on one or more scores of the one or more personality traits.

5. The method of claim 1, the operations further comprising scoring one or more emotion intensities in textual data, based on the enriched word distribution, by applying a trained prediction model to map a selected enriched word vector of the enriched word distribution to a first score representing intensity of a first emotion of the selected enriched word vector and to a second score representing intensity of a second emotion of the selected enriched word vector.

6. The method of claim 5, the operations further comprising:
   detecting an update to the textual data, wherein scoring the one or more emotion intensities in the textual data is performed responsive to the update; and
   generating feedback regarding the update, based on one or more scores of the one or more emotion intensities.

7. The method of claim 5, the operations further comprising training a bidirectional long short-term memory (BiLSTM) convolutional neural network (CNN) model based on the enriched word distribution, wherein the scoring is performed with the trained BiLSTM CNN model.

8. The method of claim 1, further comprising:
   receiving an ontology graph defining semantic relations between one or more pairs of words in the vocabulary, wherein modifying the plurality of initial word vectors comprises fitting the initial word distribution to the ontology based on the human-reaction lexicon.

9. The method of claim 8, wherein fitting the initial word distribution to the ontology comprises, for each word of a plurality of words in the vocabulary:
   minimizing a combination of distances comprising:
      a first distance between a respective enriched word vector and a respective initial word vector representing the word in the initial word distribution, and a set of distances between the respective enriched word vector and a corresponding initial word vector of each adjacent word according to the ontology;

wherein minimizing the combination of distances is based on one or more strength parameters, the one or more strength parameters defined by a human-reaction vector representing the word according to the human-reaction lexicon.

10. The method of claim 9, further comprising, for each word of the plurality of words in the vocabulary, calculating a respective strength parameter based on a difference between the human-reaction vector representing the word and a second human-reaction vector representing an adjacent word according to the ontology.

11. The method of claim 1, wherein modifying the plurality of initial word vectors comprises, for each word of a plurality of words in the vocabulary:

generating a respective normalized word vector representing the word by normalizing an initial word vector representing the word in the word distribution;

generating a respective normalized human-reaction vector by normalizing a human-reaction vector representing the word in the human-reaction lexicon;

generating a respective concatenation representing the word by concatenating, to the respective normalized word vector, the respective normalized human-reaction vector; and reducing the respective concatenation representing the word into an enriched word vector representing the word.

12. A system comprising:

an enrichment engine configured to:

receive a word distribution comprising a plurality of initial word vectors in a multidimensional vector space, each initial word vector in the plurality of initial word vectors comprising a first respective numerical value in each dimension of the multidimensional vector space and representing a respective word in a vocabulary;

map the plurality of initial word vectors to a plurality of enriched word vectors in an enriched word distribution based on a human-reaction lexicon, each enriched word vector representing a respective word in the vocabulary, and each enriched word vector in the plurality of enriched word vectors comprising a second respective updated numerical value in each dimension of the multidimensional vector space; and an emotion intensity scorer comprising a trained prediction model, the emotion intensity scorer configured to score intensities of one or more emotions in textual data, based on the enriched word distribution, by applying the trained prediction model to map a selected enriched word vector of the enriched word distribution to a first score representing intensity of a first emotion of the selected enriched word vector and to a second score representing intensity of a second emotion of the selected enriched word vector.

13. The system of claim 12, wherein, to augment the word distribution, the enrichment engine is further configured to, for each word of a plurality of words in the vocabulary:

generate a respective normalized word vector representing the word by normalizing an initial word vector representing the word in the word distribution;

generate a respective normalized human-reaction vector by normalizing a human-reaction vector representing the word in the human-reaction lexicon;

generate a respective concatenation representing the word by concatenating, to the respective normalized word vector, the respective normalized human-reaction vector; and reduce the respective concatenation representing the word into an enriched word vector representing the word.

14. The system of claim 12, wherein the enrichment engine is further configured to augment the word distribution by performing, for each word of a plurality of words in the vocabulary, operations comprising:

minimizing a combination of distances comprising:

a first distance between a respective enriched word vector and a respective initial word vector representing the word in the word distribution, and a set of distances between the respective enriched word vector and the corresponding initial word vector of each adjacent word according to an ontology;

wherein minimizing the combination of distances is based on one or more strength parameters based on a human-reaction vector representing the word in the human-reaction lexicon.

15. The system of claim 14, wherein the enrichment engine is further configured to, for each word of the plurality of words in the vocabulary:

calculate a respective strength parameter based on a difference between the human-reaction vector representing the word and a second human-reaction vector associated with an adjacent word according to the ontology.

16. A method comprising:

receiving a word distribution comprising a plurality of word vectors, each word vector representing a respective word in a vocabulary;

augmenting the word distribution with a human-reaction lexicon to generate an enriched word distribution comprising a plurality of enriched word vectors, each enriched word vector representing a respective word in the vocabulary;

wherein the augmenting comprises, for each word of a plurality of words in the vocabulary:

generating a respective normalized word vector representing the word by normalizing an initial word vector representing the word in the word distribution;

generating a respective normalized human-reaction vector by normalizing a human-reaction vector representing the word in the human-reaction lexicon;

generating a respective concatenation representing the word by concatenating, to the respective normalized word vector, the respective normalized human-reaction vector; and reducing the respective concatenation representing the word into an enriched word vector representing the word.

17. The method of claim 16, wherein the human-reaction lexicon comprises an affect lexicon.

18. The method of claim 16, further comprising at least one of retrofitting and counterfitting the enriched word distribution to an ontology.

19. The method of claim 16, further comprising scoring one or more personality traits of an author of textual data, based on the enriched word distribution.

20. The method of claim 16, further comprising scoring one or more emotion intensities in textual data, based on the enriched word distribution.

* * * * *